Aug. 14, 1928.
R. LAIR
1,680,556
STEERING MECHANISM
Original Filed June 15, 1926
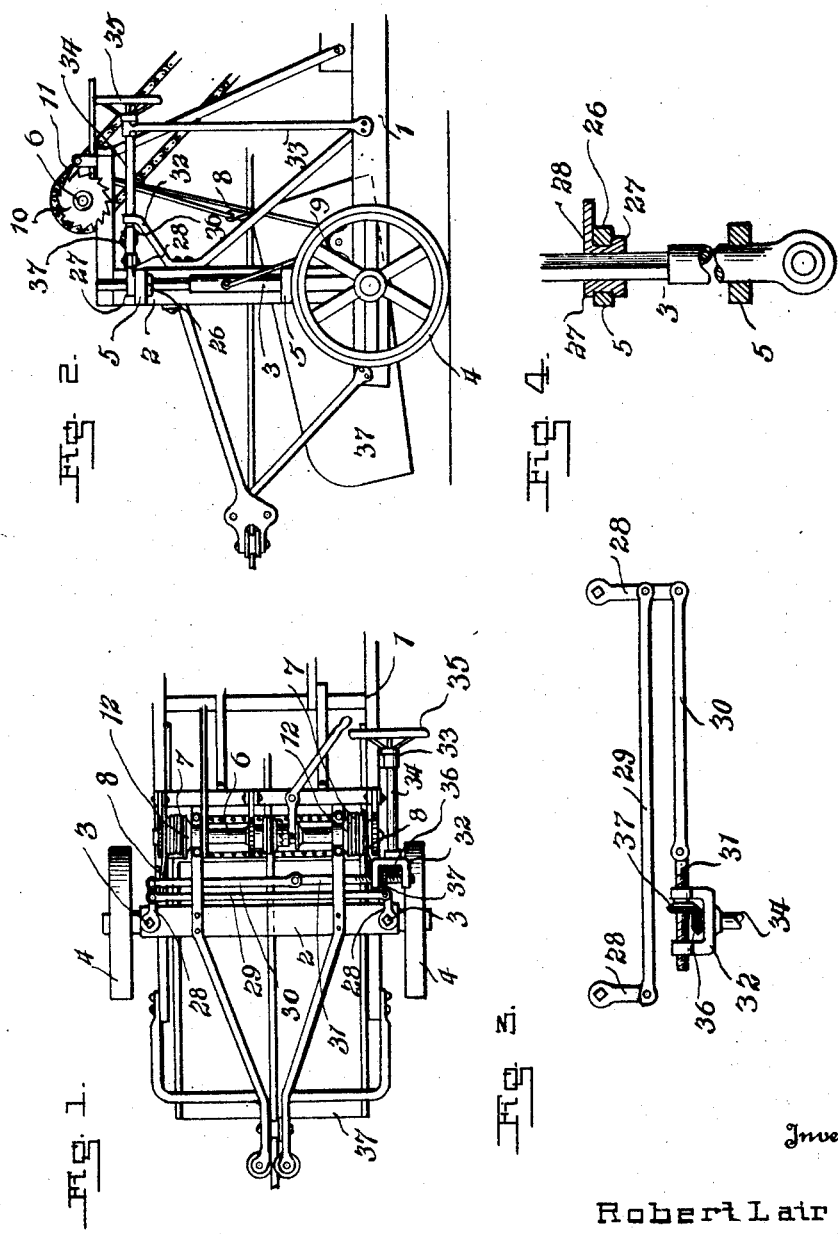
Inventor
Robert Lair
By Lacey & Lacey, Attorneys Patented Aug. 14, 1928.

1,680,556

UNITED STATES PATENT OFFICE.

ROBERT LAIR, OF KINGSTON, WASHINGTON.

STEERING MECHANISM.

Original application filed June 15, 1926, Serial No. 116,178. Divided and this application filed April 25, 1927. Serial No. 186,422.

This application is a division of an application filed by me June 15, 1926, Serial No. 116,178, the present invention having special reference to steering mechanism for excavating machines.

In the accompanying drawing:

Figure 1 is a plan view of one end of an excavating machine, showing the present invention.

Figure 2 is a side elevation of the same.

Figure 3 is an enlarged plan view of a portion of the steering mechanism.

Figure 4 is an enlarged sectional elevation of another portion of the steering mechanism.

A portion of the main frame is shown at 1, a vertical frame being carried on the end thereof.

Upon the sides of the vertical end frame 2 are mounted spindles 3 which carry ground wheels 4 at their lower ends so that the machine will be supported upon the ground and may readily travel thereover. The spindles 3 are vertically slidable in guides, indicated at 5, upon the outer sides of the respective end frames, and this slidable mounting of the spindles permits the wheels to assume any desired position vertically with respect to the main frame so that the frame will be supported at any desired height above the surface of the ground, and also permits the wheels to assume different vertical positions so that notwithstanding an inclination of the ground surface the frame will remain level. To adjust the front wheels, I provide a shaft 6 which is mounted in suitable bearings upon the upper end of the front arched frame 2 and upon the said shaft are loosely mounted drums 7, about each of which is wound a cable 8 which passes downwardly from the drum to and under a guide pulley 9 secured upon the main frame adjacent the front end thereof, as shown clearly in Figure 2, and then upwardly, the end of the cable being secured to the respectively adjacent spindle 3, as also shown in Figure 2. At the outer end of each drum 7 is a ratchet disk 10, and a pawl 11, pivoted upon the frame 2 in any convenient or preferred manner, cooperates with this ratchet to prevent reverse rotation of the drum, so that after the cable has been wound to bring the frame into the desired position the withdrawal of the moving force will not result in a dropping of the frame but the frame will remain supported in the position in which it has been set. A clutch 12 which may be of any well-known type and is illustrated conventionally is arranged to cooperate with each drum so that, when the cable is to be wound, the drum may be locked to the shaft 6 and, consequently, rotate with the shaft. If it be desired to lower the frame, all that needs to be done is to release the dog or pawl 11, whereupon the weight of the frame will cause the cable to unwind and permit descent of the frame. It will be understood that, if the surface of the ground be uneven, the wheel 4 at one side of the machine may be permitted to assume a lower position relative to the frame than the wheel at the opposite side so that the wheels will be accommodated to the inclination of the ground. The shaft 6 may be rotated by power derived from the same source as the power for operating the conveyor.

The lower portion of each spindle 3 is circular in cross section, as shown most clearly in Figure 4, so that it may not only slide vertically through the corresponding guide 5 but may also turn therein, while the upper portion of the spindle is flat-sided in cross section to engage a flat-sided bore in the collar 26 which is fitted through the upper guide 5 and is provided with flanges 27 to engage the upper and lower sides of the said guide whereby the collar will be prevented from moving vertically through the guide but may rotate therein. It will be understood that the collar may be split to facilitate assembling. Of course, the rotation of the collar will be imparted directly to the spindle and the spindles may be thus turned so as to set the ground wheels in any desired angular position to effect steering of the machine. Extending radially from the upper side of each collar 26 is a crank 28, the cranks being connected for synchronous movement by a connecting rod 29. One of the cranks is extended beyond the end of the connecting rod and a link 30 is pivoted thereto. The link 30 is disposed transversely of the main frame parallel with the connecting rod 29 and the end of the link remote from the crank is pivoted to the inner end of a threaded rod or worm 31. This threaded rod or worm is supported in a suitable bracket 32 secured to the side of the adjacent end frame 2 and supported in the said bracket and in a standard 33 rising from the main frame is a shaft 34 which is equipped with a hand wheel 35 at its free end. At the opposite end of each shaft 34 is secured a beveled pinion 36 meshing with a similar pinion 37 arranged upon the threaded rod or worm 31 between the pinion 36 and the adjacent side of the bracket 32, as clearly shown in Figure 3. The pinion 37 meshes with the pinion 36 so as to be rotated by the latter and, in turn, has an internally threaded bore or hub which engages the threaded rod 31 in such manner that, when the pinion is rotated, the rod will be caused to move axially or endwise, and this movement will be transmitted through the link 30 so that the spindles will be turned and the wheels 4 set in the desired position. By this simple arrangement, I am enabled to steer the machine, and the apparatus may be duplicated so as to effect the steering operations at both ends simultaneously so that, notwithstanding the length of the machine, a short turn may be made under some circumstances. It will also be understood that the steering operation is not affected by the vertical adjustment of the main frame.

I have illustrated the machine as equipped with an excavating scoop or scraper 37.

Having thus described the invention, I claim:

An excavating machine comprising a frame, spindles mounted vertically upon the frame, wheels carried by the lower ends of the spindles, cranks extending radially from the spindles and having sliding connection therewith, a connecting bar pivoted to and extending between said cranks, one crank being extended past the connecting bar, a link pivoted at its outer end to the free end of the extended crank and extending therefrom parallel with the connecting bar, a threaded rod pivoted to the end of the link, a steering shaft, a stationary bracket supporting one end of said steering shaft and the outer end of the threaded rod, and intermeshing pinions upon the shaft and the rod respectively within and held by said bracket, the pinion on the threaded rod having a threaded bore meshing with said rod.

In testimony whereof I affix my signature.

ROBERT LAIR. [L. S.]